3,412,169
SELECTIVE HYDROGENATION OF ACETYLENE
Robert G. Clark, Louisville, Ky., assignor to Catalysts and Chemicals, Inc., Louisville, Ky., a corporation of Delaware
No Drawing. Filed June 27, 1966, Ser. No. 560,814
6 Claims. (Cl. 260—677)

ABSTRACT OF THE DISCLOSURE

In the selective hydrogenation of acetylenic components in gas mixtures containing high concentrations of olefins, should hydrogenation of olefins begin, a temperature control problem is presented. Both hydrogenation reactions are exothermic. The temperature of the hydrogenation process can be conveniently controlled by separating the required quantity of palladium catalyst into a series of beds with interbed quench cooling stages therebetween.

---

This invention relates to the selective hydrogenation of acetylenic components in gas mixtures containing high concentrations of olefins.

Olefins such as ethylene and propylene, as commercially produced by cracking and pyrolysis, frequently contain minor amounts of acetylenic compounds, for example, acetylene, methylacetylene and the like. As a result the olefins thus produced generally are not suitable for use in the usual chemical processes, for instance, polymerization process. Usually the acetylenes must first be removed, or chemically converted, by processes such as hydrogenation. Thus, gas mixtures consisting essentially of ethylene for commercial uses should contain no more than about 10 parts per million (p.p.m.) acetylenic impurities. For the production of polyethylene, an ethylene stream is frequently demanded containing less than 5 p.p.m., and in some instances less than 1 p.p.m. acetylenic compound.

Normally acetylenes can be readily hydrogenated, acetylene to form ethylene, or ethanes, methylacetylene to form propylene or propanes, etc. However, when olefins are present, the hydrogenation process is much more difficult to carry out. Selective hydrogenation poses a difficult problem when small amounts of acetylenic compounds are present in an olefin gas mixture. Substantially all of the acetylenes must be hydrogenated, preferably to olefins, without substantial hydrogenation of olefins also occurring.

Many catalysts have been used for the selective hydrogenation of acetylene in an olefin stream. However, most of the activity is now centered around the use of palladium. Palladium catalysts are very effective selective hydrogenation catalysts. Nevertheless, palladium catalysts, while highly efficient, possess certain disadvantages from a process point of view. Because of the closeness of initiation temperatures involved, it is difficult to insure that substantially all of the acetylenes are hydrogenated to olefins without hydrogenation of olefins also occurring, particularly when an excess of hydrogen is present relative to acetylenes. Should hydrogenation of olefins commence, a temperature control problem is presented.

The selective hydrogenation of an acetylene in combination with an olefin, such as ethylene, is dependent upon the reaction initiation temperatures of the two possible hydrogenation reactions. The initiation temperature for the hydrogenation of acetylene is slightly below the ethylene hydrogenation initiation temperature. However, both of these hydrogenation reactions are exothermic. Consequently, if the acetylene hydrogenation temperature is permitted an undue rise, it will reach the ethylene hydrogenation temperature. The hydrogenation of ethylene is highly exothermic. Should this reaction commence, it will be very difficult to prevent the temperature from running out of control. For this reason high acetylene concentrations which bring about greater adiabatic temperature rises, make it very difficult to maintain selectivity. Thus, in addition to the problem of selectivity, an equally important consideration is the temperature control provision.

Normally with a palladium on alumina catalyst the operating temperature will be above 100° F., but it will vary with the ethylene hydrogenation initiating temperature, or threshold of ethylene hydrogenation temperature runaway which is generally below 200° F., say 170° F. to 180° F. The acetylene hydrogenation temperature must thus be defined in terms of the ethylene hydrogenation initiation temperature. This is especially true since both temperatures depend upon such considerations as space velocities, hydrogen partial pressure, contact time, and the particular catalyst employed. Moreover, the quantity of acetylene present is also a function of other existing factors, such as the presence or absence of inhibitors and promoters in the olefin feed gas stream, for example sulfur compounds, butadiene, carbon monoxide, and the like.

According to the practice of this invention a process is provided which not only prevents runaway temperatures, but which lends itself to the hydrogenation of streams containing more acetylene than processes now in use in front end cleanup, that is acetylene hydrogenation prior to ethylene fractionation wherein an excess of hydrogen relative to acetylene is present. A process is provided for operating this exothermic hydrogenation with a lesser possibility of the adiabatic temperature rise bringing the reaction temperature to the runaway ethylene hydrogenation threshold. In accordance with the process of this invention the selective hydrogenation is accomplished by separating the required quantity of palladium catalyst into a series of beds with interbed quench cooling states therebetween. At an initial temperature lower than the runaway temperature by an amount $\Delta T$ of 40° F. to 70° F., the ethylene stream is introduced into the first bed. The olefin feed stream is then passed alternately through catalyst bed and quenching stages. The quantity of catalyst in each bed is such that at a constant overall flow rate the space velocity through the catalyst stage is such that adiabatic temperature rise across the bed does not exceed the $\Delta T$. The quenching liquid is a liquefied $C_2$ or $C_3$ hydrocarbon, or a mixture of these, in an amount having a heat capacity due to both its latent heat of vaporization and its specific heat to absorb the adiabatic heat of reaction.

The catalysts employed are alumina catalysts containing 0.02 to 1.0 preferably 0.05 to 0.1 weight percent palladium. The surface area of the catalyst usually will be in the range of 10 to 500 square meters per gram. A desirable catalyst base is an alumina prepared according to Ser. No. 532,021 filed in Jan. 7, 1966.

A preferred process for preparing this catalyst includes the steps of:

(1) Extruding the alumina into the desired size pellets;
(2) Drying the pellets;
(3) Calcining the pellets at 950° F.;
(4) Determining the volume of water required to completely cover a given quantity of catalyst (usually 100 lbs. of carrier per batch);
(5) For 100 lbs. of carrier placing 0.08 lb. of palladium (as the chloride) in a container then diluting to the predetermined volume;
(6) Completely submerging the 100 lbs. of carrier in the palladium chloride solution;
(7) Allowing the catalyst to stand 30 minutes; draining off the liquid; drying at 250° F.; and
(8) Calcining the palladium impregnated catalyst at 650° F.

While the process of the invention is applicable to the selective hydrogenation of acetylenes in various gas mixtures, it is particularly applicable to the selective hydrogenation of acetylenes in ethylene gas mixtures produced by the cracking of hydrocarbons such as ethane, propane, naphtha and light distillates obtained in the refining of petroleum. Such gas mixtures have a composition by volume as follows: Hydrogen 8 to 45%; methane 2 to 40%; acetylene 0.05 to 2%; ethylene 20 to 45%; ethane 3 to 30%; propylene up to 20%; and propane up to 10%. The process of the invention is particularly applicable to the selective hydrogenation of gas mixtures containing 2% or less of acetylenes. In fact quite often the acetylene hydrogenation will be a stage of a naphtha cracking overall process. It is preferred that the gas mixture not contain more than 0.5% $C_4$ or higher olefins, for example of butadiene.

The gas mixture subjected to the process of the invention should contain hydrogen in an amount at least sufficient to hydrogenate the acetylenes to the corresponding olefins. If the gas mixture to be treated does not contain this amount of hydrogen, hydrogen should be added as necessary.

The process of the invention desirably will be operated at pressures within the range 15 to 500 preferably 100 to 300 pounds per square inch gauge, and overall space velocities within the range 1,000 to 25,000 preferably 5,000 to 15,000 volumes per volume (generally cubic foot) of catalyst per hour, the gas volume being measured at 20° C. and atmospheric pressure. At these rates, and with catalyst beds divided according to the invention, space velocity across individual beds may be as high as 200,000 or higher.

Various details of process of this invention, as well as some of its variations, can perhaps best be understood by references to specific examples included herein for the purpose of illustration. The catalyst employed (Catalyst a) is a commercially available hydrogenation catalyst recommended for the selective hydrogenation of acetylenic compounds in the presence of ethylene and an excess of hydrogen. This catalyst is in the form of 4–8 mesh spheres having a bulk density of 40±5 lbs./cu. ft. The catalyst is an extruded alumina having a surface area of 90 to 300 square meters per gram, impregnated with 0.05 percent palladium as set forth in the eight steps previously described.

The feed compositions are as follows:

TABLE A.—FEED STREAMS

|  | Examples 1 and 2 | Examples 3 and 4 |
| --- | --- | --- |
| Hydrogen | 13.8 | 11.2 |
| Methane | 31.4 | 33.0 |
| Ethylene | 32.7 | 34.0 |
| Ethane | 8.8 | 7.0 |
| Propylene | 12.0 | 13.0 |
| Propane | 0.5 | .35 |
| Acetylene | 0.5 | 1.00 |
| Methyl Acetylene | 0.2 | .3 |
| Propadiene | 0.1 | .15 |

The exothermic nature of the hydrogenation reactions occurring is illustrated by the following heats of reaction for the above feed stream, based on hydrogenation of the fractions set forth in the table.

TABLE B.—HEATS OF REACTION

| Component | Heat of Hydrogenation B.t.u./lb. mol in feed | Lb. mol/hr. in feed | Fraction Hydrogenated | Evolved Heat B.t.u./hr. |
| --- | --- | --- | --- | --- |
| Acetylene | 137,000 | 5 | 1.0 | 685,000 |
| Methyl Acetylene | 126,000 | 2 | .98 | 247,000 |
| Propadiene | 129,000 | 1 | .20 | 25,800 |
| Ethylene | 60,000 | 327 | .005 | 98,100 |

NOTE.—Examples 1 and 2: Total Heat=1,053,900 B.t.u./Hr.; Examples 3 and 4: Total Heat=1,881,700 B.t.u./Hr.

Example 1

The feed stream described in Table A is introduced into a reactor in which the catalyst is divided into five beds, the reactor being adapted for the introduction of a liquid quench between beds. The composition of the quench is: ethylene—60%; ethane—17%; propylene—22%; and propane—1%. The heat absorption value of the quench composition (latent heat of vaporization at −19° F. and specific heat from −19° F. to 110° F.) is 6,150 B.t.u. per lb. mol at 200 p.s.i.a. Other parameters are as follows:

Reaction conditions—
  Overall flow rate _____ 1,000 lb. mol/hr.
  Pressure _____ 200 p.s.i.a.
  Overall space velocity _____ 4,715 s.c.f.h./c.f.
  Total catalyst volume _____ 81 cubic feet (c.f.).
  Catalyst bed arrangement __ Five beds.
  Product requirement _____ Less than 5 p.p.m. $C_2H_2$ in exit (inlet gas flow basis).

Temperature rises due to the exotherms in each catalyst bed are given in Table 1. From this rise and the overall flow rate the heat Q produced in each bed is derived from $Q = \Delta T \times N \times C_p$ where $\Delta T$ is the temperature rise (21°), N is the flow rate in lb. mols per hr. (1,000) and $C_p$ is the specific heat in B.t.u.'s per hour per degree F. per lb. mol (which is 9.8), i.e. $21 \times 1,000 \times 9.8 = 211,180$ heat produced in the first bed. Thirty-four lb. mol of quench per hour at 6,150 B.t.u. are required. In later stages the flow rate is 1,000 plus the quench added to proceeding beds.

TABLE 1

| Bed | Catalysts Volume, c.f. | Temperature Rise, °F. | Heat Produced In Bed Approximately | Quench Reqt. Lb. mol/hr. | Acetylene Content Exit Bed, p.p.m.[1] |
| --- | --- | --- | --- | --- | --- |
| 1 | 2.5 | 21 | 211,180 | 34.00 | 4,000 |
| 2 | 5.0 | 28 | 282,981 | 46.00 | 2,660 |
| 3 | 15.5 | 39 | 413,912 | 67.00 | 700 |
| 4 | 29.0 | 13 | 135,155 | 22.00 | 60 |
| 5 | 29.0 | 2 | 12,670 | ---- | 5 |

[1] Based on inlet gas rate to converter.

Example 2

In this example the quantity of quench and other results are shown, obtained by the procedure of Example 1, but with an overall flow rate of 500 lb. mol/hr. All other conditions and streams are the same as in Example 1.

TABLE 2

| Bed | Catalysts Volume, c.f. | Temperature Rise, °F. | Heat Produced In Bed Approximately | Quench Reqt. Lb. mol/hr. | Acetylene Content Exit Bed, p.p.m.[1] |
| --- | --- | --- | --- | --- | --- |
| 1 | 2.5 | 36 | 176,335 | 29.00 | 3,330 |
| 2 | 5.0 | 40 | 198,510 | 32.00 | 1,450 |
| 3 | 15.5 | 29 | 142,547 | 23.00 | 100 |
| 4 | 29.0 | 2 | 10,560 | 2.00 | 5 |
| 5 | 29.0 | (²) | ---- | ---- | 5 |

[1] Based on inlet gas rate to converter.
[2] Nil.

Foregoing Examples 1 and 2 illustrate quenching wherein bed sizes, known by experience to be desirable, are proportioned as follows: First bed—3.1%; Second bed—6.1%; Third bed—19.2%; Fourth bed—35.8%; and Fifth bed—35.8%. In the following Examples 3 and 4 bed sizes are proportioned: First bed 2.4%; Second bed—4.7%; Third bed—9.5%; Fourth bed—41.7%; and Fifth bed—41.7%.

Example 3

The feed stream described in Table A is introduced into a reactor in which the catalyst is divided into five beds, as in Example 1, the reactor being adapted for the introduction of a liquid quench between beds. The quench is ethylene liquid having a heat absorption value (latent heat of vaporization at −11° F. and specific heat from −11° F. to 110° F.) of 5,420 B.t.u. per lb. mol at 300 p.s.i.a. Other parameters are as follows:

Reaction conditions—
    Overall flow rate _____ 1,000 lb. mol/hr.
    Pressure _____ 300 p.s.i.a.
    Overall space velocity _____ 4,600 s.c.f.h./c.f.
    Total catalyst volume _____ 84 cubic feet (c.f.).
    Catalyst bed arrangement __ Five beds.
    Product requirement _____ Less than 5 p.p.m. $C_2H_2$ in exit (inlet gas flow basis).

Temperature rises due to the exotherms in each catalyst bed are given in Table 3, the heat Q produced in each bed being derived from $Q = \Delta T \times N \times C_p$ as in the preceding examples.

TABLE 3

| Bed | Catalysts Volume, c.f. | Temperature Rise, °F. | Heat Produced In Bed Approximately | Quench Reqt. Lb. mol/hr. | Acetylene Content Exit Bed, p.p.m.[1] |
|---|---|---|---|---|---|
| 1 | 2 | 35 | 357,529 | 66 | 8,100 |
| 2 | 4 | 50 | 523,113 | 97 | 5,320 |
| 3 | 8 | 50 | 575,800 | 106 | 2,260 |
| 4 | 35 | 33 | 413,974 | 76 | 60 |
| 5 | 35 | 5 | 11,290 | | 1.7 |

[1] Based on inlet gas rate to converter.

Example 4

This example shows the quantity of quench and other results when the overall flow rate is 750 lb. mol/hour. All other conditions and streams are the same as Example 3.

TABLE 4

| Bed | Catalysts Volume, c.f. | Temperature Rise, °F. | Heat Produced In Bed Approximately | Quench Reqt. Lb. mol/hr. | Acetylene Content Exit Bed, p.p.m.[1] |
|---|---|---|---|---|---|
| 1 | 2 | 47 | 342,470 | 63 | 7,580 |
| 2 | 4 | 57 | 457,253 | 84 | 4,360 |
| 3 | 8 | 47 | 413,975 | 76 | 1,420 |
| 4 | 35 | 21 | 199,460 | 36 | 11 |
| 5 | 35 | 2 | 15,054 | | 1.7 |

[1] Based on inlet gas rate to converter.

From the foregoing data it can be seen that an efficient process is provided for the selective hydrogenation of acetylene in an ethylene gas stream. The specific advantages of this system are: very close control of temperature will minimize polymer formation; higher acetylene content of feed streams can be treated without recycle; high turndown ratios are practical; it is possible to "trim" the control of inlet temperatures and eliminate cycles common to steam heaters; the reaction can be quenched quickly in case of a runaway; the reactor can be quickly purged in case of flow stoppage; and the pressure drop is minimized.

Overall heat of reaction, and therefore quench consumption, is a function of the flow rate, reactant concentrations and relative hydrogenation of feed. Similarly the total catalyst volume is determined by pressures, acetylene concentration of the feed, product requirements and reaction conditions.

It will be obvious from the foregoing examples that the inlet feed flow rate is constant, as is usually the case. However, the space velocity across each bed is determined by the size of the particular bed. In proportioning bed sizes, space velocities in various beds of a converter, for a given operating feed and pressure, are calculated as inversely proportional to the logarithm of the ratio of inlet and outlet acetylene concentrations. It will be obvious to those skilled in the art, given the foregoing considerations, that proportioning in this way is a satisfactory method of bed sizing. Reactor operation, then, is a series of space velocity controlled adiabatic temperature rises not exceeding ΔT, with interbed quench to reduce the temperature of the gas stream entering a subsequent bed to its reaction temperature. Thus, the exotherm occurring in each hydrogenation stage does not raise the stream temperature beyond the threshold of runaway ethylenic hydrogenation. In fact in later stages due to the smaller quantity of acetylene present and a correspondingly small exotherm, the temperature rise may be less than the 40° F. ΔT.

The selection of the source of the quench hydrocarbon is primarily one of economics. However, physical properties must be considered. The higher operative pressures will require consideration of boiling temperature. At a high pressure, a liquid with a high proportion of $C_3$ will be required in larger quantities than a $C_2$ rich liquid. It is expected that the liquid quench streams will be obtained from the ethylene plant distillation equipment downstream of the reactor. The liquid, of course, requires refrigeration to produce. The most practical source of this refrigeration is as an incremental addition to refrigeration capacity which is already required in the purification train. This does not preclude, however, an independent refrigeration unit to liquify part of the exit gas from the reactor and thus supply the quench.

The first step in the separation and purification system is a methane and hydrogen separation. It is best to have these components eliminated from the quench stream since they will contribute little to heat absorption. The demethanizer bottom stream, consisting principally of ethylene, ethane, propane, and propylene is the most convenient source of liquid quench. This precludes any necessity of enlarging the size of downstream separation equipment beyond that necessary without a quench requirement. If it is desirable to use a higher proportion of $C_2$ in the quench, this can be obtained further downstream with only moderate increases in capacity over no quench requirements.

Various advantages and modifications of the invention have been illustrated. Thus, several sources of liquefied $C_2$ and $C_3$ hydrocarbons are available. In addition a wide variety of operating temperatures can be used. Bed sizes can be adjusted to accommodate any inlet flow rate. Other ramifications will occur to those skilled in the art. Such modifications are deemed to be within the scope of this invention.

What is claimed is:
1. In the selective hydrogenation of acetylene in admixture in gases containing olefins wherein the gas mixture and hydrogen are subjected to hydrogenation over a catalyst containing 0.02 to 1 percent palladium on an alumina carrier and operating at an olefin hydrogenation runway temperature threshold of about 170° F. to 200° F., a process for operating this exothermic, selective hydrogenation with a lesser possibility of the adiabatic temperature rise bringing the reaction temperature to the runaway olefin hydrogenation threshold which comprises separating the required quantity of catalyst into a series of beds with interbed quench cooling stages therebetween, at an initial temperature lower than the runaway temperature by an amount ΔT of about 40° F. to 70° F., introducing the acetylene-olefin stream into the first bed, and then passing the olefin feed stream alternately through catalyst bed and quenching stages, the quantity of catalyst in each bed being such that at a constant overall flow rate the space velocity through each catalyst bed is such that the adiabatic temperature rise across the bed does not exceed $\Delta T$, the size of each catalyst bed being such that a space velocity is determined whereby the $\Delta T$ across a succeeding bed does not exceed that across the bed immediately preceding, the quenching liquid being a hydrocarbon stream rich in one of $C_2$, $C_3$ and mixtures of these hydrocarbons employed in an amount having a heat capacity due to both its latent heat of vaporization and its specific heat to absorb the adiabatic heat of reaction.

2. The process of claim 1 wherein the initial temperature is 60° below the ethylene hydrogenation temperature and wherein the $\Delta T$ in succeeding stages does not exceed 40° F.

3. The process of claim 1 wherein the initial temperature is in the range of 100° F. to 120° F. and wherein the $\Delta T$ does not exceed 70° F.

4. The process of claim 1 wherein the acetylene hydrogenation is a stage of a naphtha cracking process, and wherein the quenching liquid is one of the liquefied streams from the refrigeration system in an ethylene purification stage of the process.

5. The process of claim 1 wherein palladium catalyst contains 0.05 to 1.0 weight percent palladium on an alumina carrier having a surface area of 50 to 500 square meters.

6. The process of claim 5 wherein the gas mixture contains 0.05 to 2 mol percent acetylene and 20 to 45 percent ethylene and wherein the space velocity across each catalyst bed is 1,000 to 25,000 gas volumes per volume of catalyst per hour.

References Cited

UNITED STATES PATENTS

| | | | |
|---|---|---|---|
| 3,091,584 | 5/1963 | Singer | 208—65 |
| 3,116,342 | 12/1963 | Robinson et al. | 260—677 |
| 3,198,727 | 8/1965 | Lifland | 208—65 |
| 3,309,421 | 3/1967 | Kirk et al. | 208—143 |
| 3,341,613 | 9/1967 | Hann | 208—143 |

DELBERT E. GANTZ, *Primary Examiner.*

H. LEVINE, *Assistant Examiner.*